United States Patent [19]

Takahashi

[11] Patent Number: 4,734,781

[45] Date of Patent: Mar. 29, 1988

[54] AUTOMATIC FRAMING DEVICE FOR PHOTOGRAPHIC USE

[75] Inventor: Isao Takahashi, Tokyo, Japan

[73] Assignee: Fuji Photo Film Co., Ltd., Japan

[21] Appl. No.: 888,784

[22] Filed: Jul. 22, 1986

[30] Foreign Application Priority Data

Jul. 25, 1985 [JP] Japan .............................. 60-112946[U]

[51] Int. Cl.⁴ .............................................. H04N 1/40
[52] U.S. Cl. ..................... 358/280; 358/293; 358/909
[58] Field of Search ................. 358/280, 282, 214.8, 358/76, 293, 256, 909

[56] References Cited

U.S. PATENT DOCUMENTS 4,496,983  1/1985  Takemaka ............................ 358/76
4,583,186  4/1986  Davis et al. ............................ 358/76
4,656,524  4/1987  Norris et al. ............................ 358/76

Primary Examiner—Edward L. Coles, Sr.
Attorney, Agent, or Firm—Abelman Frayne Rezac & Schwab

[57] ABSTRACT

An automatic framing device for photographic use for recording a video signal representing a photographic image on a recording medium by taking the photographic image by a video camera, having control means for detecting edges along X-Y coordinates of the photographic image placed on a table having an X-Y plane and driving the table so that the center of the photographic image is in line with the optical axis of a zoom lens of the video camera, and adjusting the zoom lens so that the entire photographic image is reproduced within a television screen.

3 Claims, 10 Drawing Figures

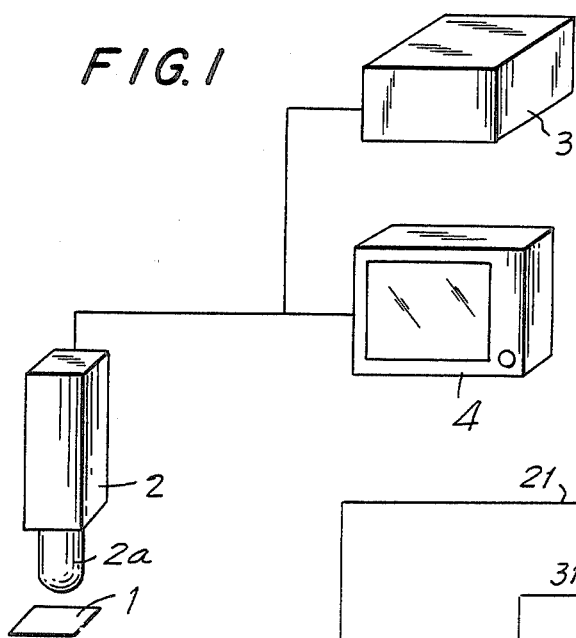
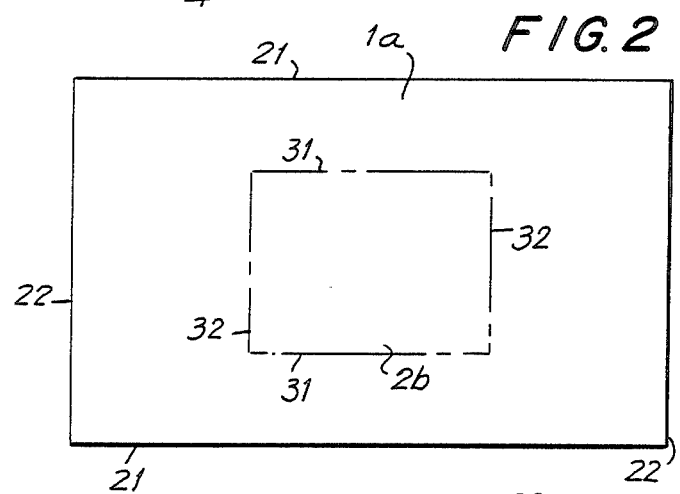
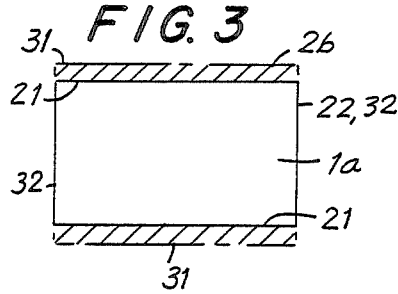
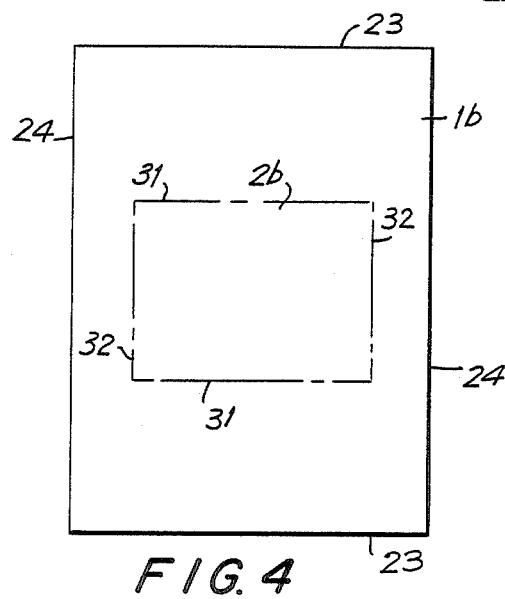

AUTOMATIC FRAMING DEVICE FOR PHOTOGRAPHIC USE

FIELD OF THE INVENTION

This invention relates to an automatic framing device for photographic use which is usefully applied to a photographic image pickup system for recording a video signal representing a photographic image on a recording medium by taking the photographic image by photographing means.

BACKGROUND OF THE INVENTION

With recent popularization of video cameras, it has become popular that photographic subjects such as printed photographic images (hereinafter referred to as "prints") are recorded on a magnetic recording medium such as a video disk to make a so-called video album, which can be reproduced on a television screen at any time.

FIG. 1 is a diagrammatic view showing schematically a recording system for magnetically recording the prints for materializing the above described purpose. Referring to FIG. 1, numeral 1 indicates a print to be picked up, numeral 2 indicates a video camera having a zoom lens 2a, numeral 3 indicates a magnetic recording device, and numeral 4 indicates a television monitor.

To record the print 1 with this recording system, the print 1 is placed beneath the zoom lens 2a of the video camera, and the position of the print 1 and the magnification of the zoom lens 2a are adjusted while observing the image reproduced on the television monitor 4. When the image of the print 1 is correctly reproduced on the television monitor 4, the print 1 is recorded on the magnetic recording device 3.

The print 1 to be recorded with the above recording system includes various sizes. So far a troublesome manipulation for obtaining an adequate magnification by moving the zoom lens 2a has been required every time the size of the print 1 varies. The adequate magnification is a value at which the entire area of the print 1 can be contained just within the viewing frame of the photographing means.

OBJECT AND SUMMARY OF THE INVENTION

With a view to obviate all of the conventional art defects of the recording system, it is a primary object of the present invention to provide an automatic framing device for photographic use, which automatically determines the magnification of the zoom lens according to the size of print to be recorded and positions the print as specified.

In accordance with the present invention which attains the above object, there is provided an automatic framing device for photographic use for recording a video signal representing a sheet bearing photographic image or the like on a recording medium by taking the sheet by photographing means, comprising a table having a horizontal plane positioned beneath the photographing means, movable in directions of an X axis and a Y axis in the horizontal plane with the sheet placed on the horizontal plane, an L-shaped position restricting member disposed on the table for restricting the position of the sheet on the table by contacting a corner of the sheet against the L-shaped position restricting member, a first sensor and a second sensor for detecting lengths of the sides of the sheet along the X axis and Y axis from a reference point, the reference point being a cross-point of contact lines of the sheet with the L-shaped position restricting member, and a control means for comparing length signals representing lengths of sides of the sheet detected by the first and second sensors, driving a zoom lens of the photographing means so as the entire area of the sheet to be within a viewing frame of the photographing means in dependence on the output signal of the first sensor when $$\frac{\text{signal detected by second sensor}}{\text{signal detected by first sensor}} < \frac{b}{a} = \frac{\text{length of shorter side of viewing frame}}{\text{length of longer side of viewing frame}}$$

or on the output signal of the second sensor when $$\frac{\text{signal detected by second sensor}}{\text{signal detected by first sensor}} > \frac{b}{a}$$

and moving the table so as the optical axis of the zoom lens to be positioned centrally of the sheet.

BRIEF DESCRIPTION OF THE DRAWINGS

FIG. 1 is a diagrammatic view showing schematically a conventional art recording system, FIGS. 2 through 8 are schematics for explaining the principle of the present invention.

DESCRIPTION OF THE PREFERRED EMBODIMENT

Figure 5:
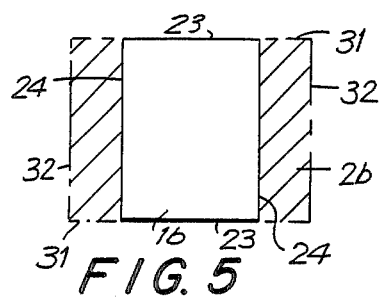

Before proceeding with the description of a preferred embodiment, the principle of the present invention will now be described with reference to FIGS. 2 through 8 which schematically show the relation between prints of different sizes and the image of a video camera as a photographing means. In FIGS. 2 through 8, sides of print 1a, 1b, and 1c are indicated with solid lines, and those of the video camera image with dot-bar lines. For the purpose of explaining the principle of the present invention, the print 1a shown in FIGS. 2 and 3 has an aspect ratio of 5:3, the print 1b shown in FIGS. 4 and 5 has an aspect ratio of 3:4, the print 1c shown in FIGS. 6 through 8 has an aspect ratio of 8:7, and a video camera image 2b has an aspect ratio of 4:3.

To contain the entire area of the print 1a as shown in FIG. 2 within the video camera image 2b, the magnification of a zoom lens 2a of a video camera 2 can be determined so that vertical sides 22 and 22 are aligned with shorter sides 32 and 32 relative to the length of horizontal sides 21 and 21 in the Figure which are the longer sides of the print 1a. As a result, as shown in FIG. 3, blank areas or strips, which do not contain the image information of the print 1a, would occur between longer sides 31 and 31 and the sides 21 and 21 of the image 2b as indicated by shading, however, the entire image information of the print 1a can be contained in the image 2b.

To contain the entire area of the print 1b as shown in FIG. 4 within the image 2b, the magnification of the zoom lens 2a of the video camera 2 can be determined so that vertical sides 23 and 23 are aligned with longer sides 31 and 31 relative to the length of vertical sides 24 and 24 in the Figure which are the longer sides of the print 1b. As a result, as shown in FIG. 5, blank areas or strips not containing the image information of the print 1b would occur between the shorter sides 32 and 32 and the sides 24 and 24 of the image 2b as indicated by shading, however, the entire image information of the print 1b can be contained in the image 2b.

Figure 6:
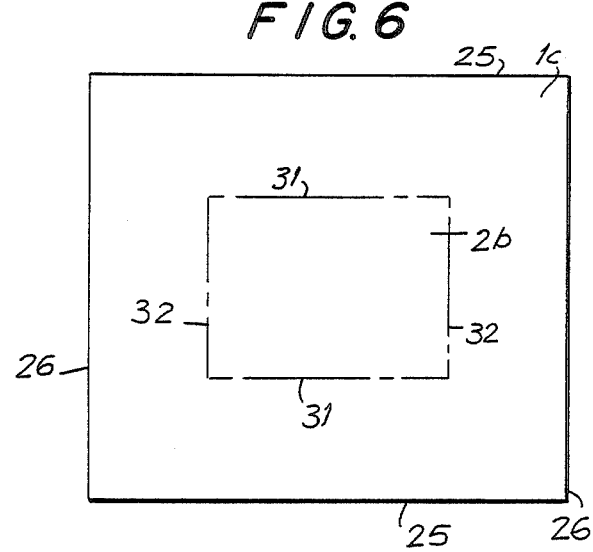
Figure 7:
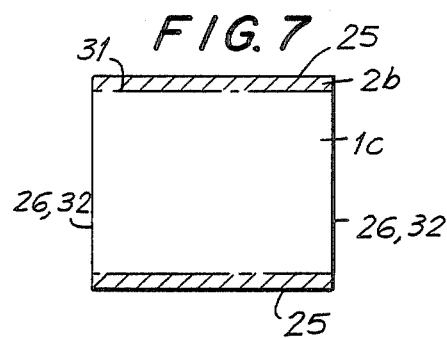
Figure 8:
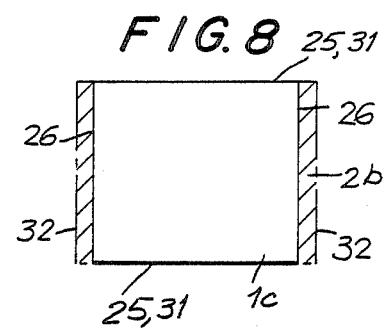

In most cases, as with the examples shown in FIGS. 2 through 5, the magnification of the zoom lens 2a can be determined relative to the longer sides of the print to contain the entire print in the video camera image, however, this can in certain circumstances result in improper framing of the print, for example, as shown in FIG. 6, with the print 1c having an aspect ratio of 8:7, part of the print would be out of the video camera image. To explain further in detail, the longer sides of the print 1c shown in FIG. 6 are the horizontal sides 25 and 25. If the magnification of the zoom lens 2a is determined relative to the length of the sides 25 and 25 so that vertical sides 26 and 26 are aligned with the shorter sides 32 and 32 of the image 2b, the sides 25 and 25 will be out of the longer sides 31 and 31, as shown in FIG. 7. As a result, the image information of the print 1c in the shaded areas will be lost. In such a case, the magnification of the zoom lens 2a of the video camera 2 must be determined relative to the length of sides 26 and 26 so that the sides 25 and 25 are aligned with the longer sides 31 and 31, as shown in FIG. 8.

Therefore, with any size of the print, the aspect ratio of the image 2b must be considered in order to contain the entire print within the image 2b. Thus, with the image 2b of the video camera 2 having an aspect ratio of 4:3, and the aspect ratio of the horizontal sides and the vertical sides of the print being x:y, the value y/x is compared with 3/4, and the magnification of the zoom lens 2a can be determined relative to the length of the vertical sides of the print when $y/x > 3/4$, or relative to the length of the horizontal sides when $y/x < 3/4$.

For generalization, with a frame of the photographing means having an aspect ratio of a:b, wherein a is greater than b, the value y/x is compared with the value b/a, and the magnification of the zoom lens can be determined relative to the length of vertical sides of the print when $y/x > b/a$, or relative to the length of horizontal sides of the print when $y/x < b/a$.

Figure 9:
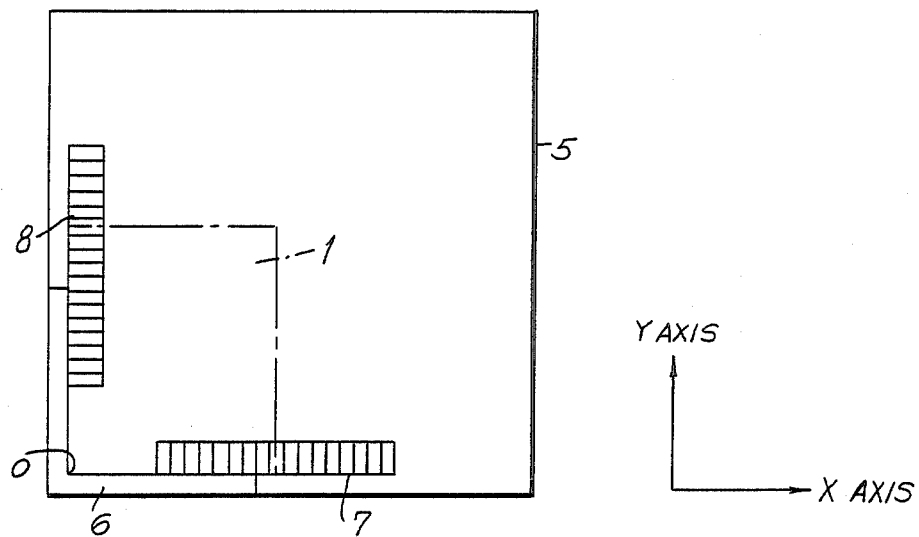
FIG. 9 is a schematic view of a table used in an embodiment according to the present invention.

A preferred embodiment of the present invention will now be described in detail with reference to the drawings. FIG. 9 is a schematic view of a table of the embodiment according to the present invention. Referring to FIG. 9, a table 5 has a horizontal plane positioned beneath a video camera 2 (see FIG. 1) and movable in directions of X and Y axes with a print 1 placed on the horizontal plane. An L-shaped position restricting member 6 is disposed on the table, and the position of the print 1 on the table 5 is restricted by contacting a corner of the print 1 against the L-shaped position restricting member. The cross-point of the contact lines of position restricting member 6 with the print 1 is a reference point 0. A sensor 7 is disposed along the direction of the X axis on the position restricting member 6 and detects length of a side of the print 1 on the table 5 along the X axis from the reference point 0. A sensor 8 is disposed along the direction of the Y axis on the position restricting member 6 and detects length of a side of the print 1 on the table 5 along the Y axis from the reference point 0. These sensors 7 and 8 can be of any type which detects lengths of individual sides of the print 1, and this embodiment uses a type consisting of a number of sensor chips disposed along the X and Y axes. With this type of sensor, lengths of the individual sides of the print 1 can be determined by detecting up to which sensor chips are interrupted from light.

Figure 10:
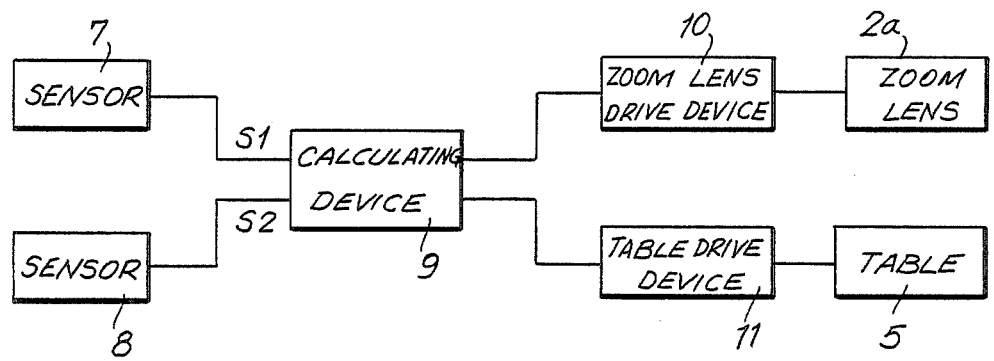
FIG. 10 is a block diagram showing the entire embodiment according to the present invention.

FIG. 10 is a block diagram showing the entire device of the embodiment according to the present invention. Referring to FIG. 10, length signals S1 and S2, outputted from the sensors 7 and 8, representing the length of sides of the print 1 are supplied to a calculating device 9. Based on the length signals S1 and S2, the calculating device 9 determines the position of the center of the print 1, and controls a table drive device 11 to move the table 5 according to coordinates of the position of the center in an X-Y coordinate system until the center of the print 1 is aligned with the optical axis of a zoom lens 2. At the same time, the calculating device 9 compares the length signals S1 and S2, and controls a zoom lens drive device 10 to move the zoom lens so that the entire print 1 is within the viewing frame of the zoom lens, using the length signal S1 from the sensor 7 when length signal S2/length signal $S1 < 3/4$, or the length signal S2 from the sensor 8 when length signal S2/length signal $S1 > 3/4$. The magnification of the zoom lens 2a corresponding to the length signals S1 and S2 detected by the sensors 7 and 8 is previously stored in the calculating device 9. Therefore, when lengths of the sides of the print 1 are determined from the length signals S1 and S2, and one of the length signals S1 and S2 is selected to be used, the magnification of the zoom lens 2a is automatically determined.

To say in detail, the magnification of the zoom lens 2b corresponding to the length detected by the sensor 7 and that corresponding to the length detected by the sensor 8 are stored, for example, in the form of a table, in the calculating device 9. Thus, when one of the sensors 7 and 8 is selected to be used, the magnification of the zoom lens is automatically determined, and a signal representing the determined magnification is then supplied to the zoom lens drive device 10.

Since the video camera has an aspect ratio of 3:4, which is normally same as that of the television screen, the magnification of the zoom lens 2a can be determined relative to the length of the longer side along the X axis when $S2/S1 < 3/4$. On the other hand, when $S2/S1 > 3/4$, such as for a vertically oriented print 1, if the magnification of the zoom lens 2a is determined relative to the length of the side along the X axis of the print 1, the upper part of the print 1 along the Y axis will not be reproduced on the television screen. In this case, the magnification of the zoom lens 2a is determined relative to the length of the side along the Y axis.

When recording the print 1 with the above described embodiment according to the present invention, with the print 1 placed on the table 5, the sensors 7 and 8 detect lengths of the sides of the print 1 along the X and Y axes, based on the lengths the calculating device 9 makes necessary calculation to control the zoom lens 2a and the table 5, and the magnification of the zoom lens 2a and the position of the table 5 can be appropriately determined.

By virtue of such an arrangement of the automatic framing device for photographic use as described above with reference to the embodiment, the magnification of the zoom lens and the position of the print relative to the video camera can be determined appropriately and automatically when the print is placed on the table.

I claim:

1. An automatic framing device for photographic use for recording a video signal representing a sheet bearing photographic image or the like on a recording medium by taking said sheet by photographing means, comprising a table having a horizontal plane positioned beneath said photographing means, movable in directions of an X axis and a Y axis in said horizontal plane with said sheet placed on said horizontal plane, an L-shaped position restricting member disposed on said table for restricting position of said sheet on said table by contacting a corner of said sheet against said L-shaped position restricting member, a first sensor and a second sensor for detecting lengths of sides of said sheet along said X axis and Y axis from a reference point, said reference point being a cross-point of contact lines of said sheet with said L-shaped position restricting member, and a control means for comparing length signals representing lengths of sides of said sheet detected by said first and second sensors, driving a zoom lens of said photographing means so as the entire area of said sheet to be within a viewing frame of said photographing means in dependence on output signal of said first sensor when $$\frac{\text{signal detected by second sensor}}{\text{signal detected by first sensor}} < \frac{b}{a} = \frac{\text{length of shorter side of viewing frame}}{\text{length of longer side of viewing frame}}$$

or on output signal of said second sensor when $$\frac{\text{signal detected by second sensor}}{\text{signal detected by first sensor}} > \frac{b}{a}$$

and moving said table so as the optical axis of said zoom lens to be positioned centrally of said sheet.

2. An automatic framing device for photographic use as claimed in claim 1, wherein b/a is 3/4.

3. An automatic framing device for photographic use as claimed in claim 2, wherein said photographing means is a video camera operatively connected to a television monitor and to a video recording device.

* * * * *